Feb. 1, 1944.  E. H. PORTER  2,340,558
AUTO SLED
Filed May 23, 1941  4 Sheets-Sheet 1
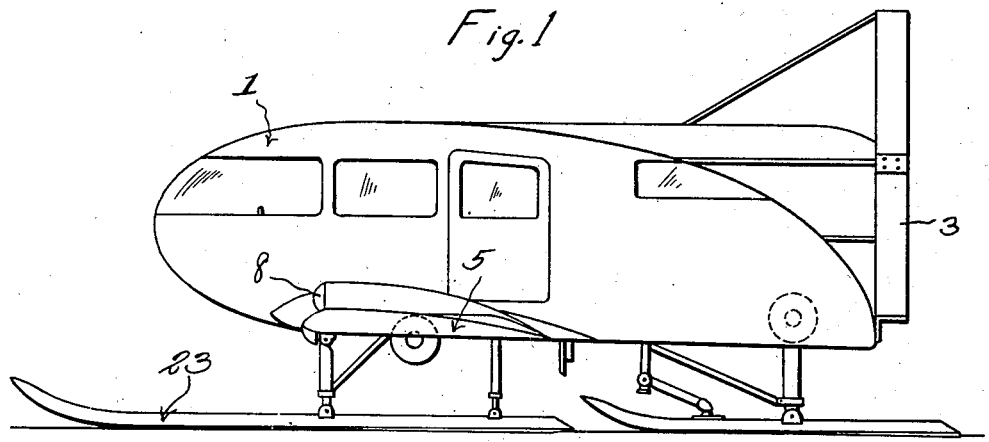
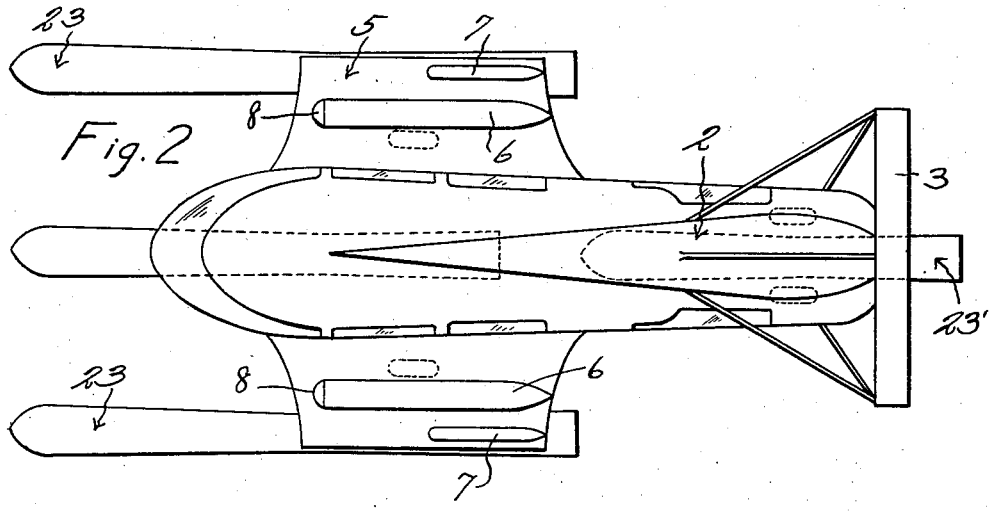
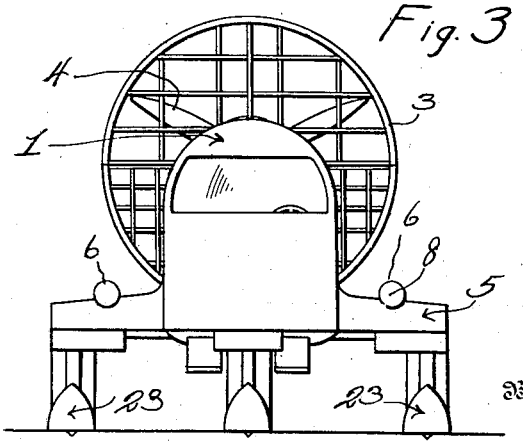
Edward H. Porter
Inventor
By Watson E. Coleman
Attorney

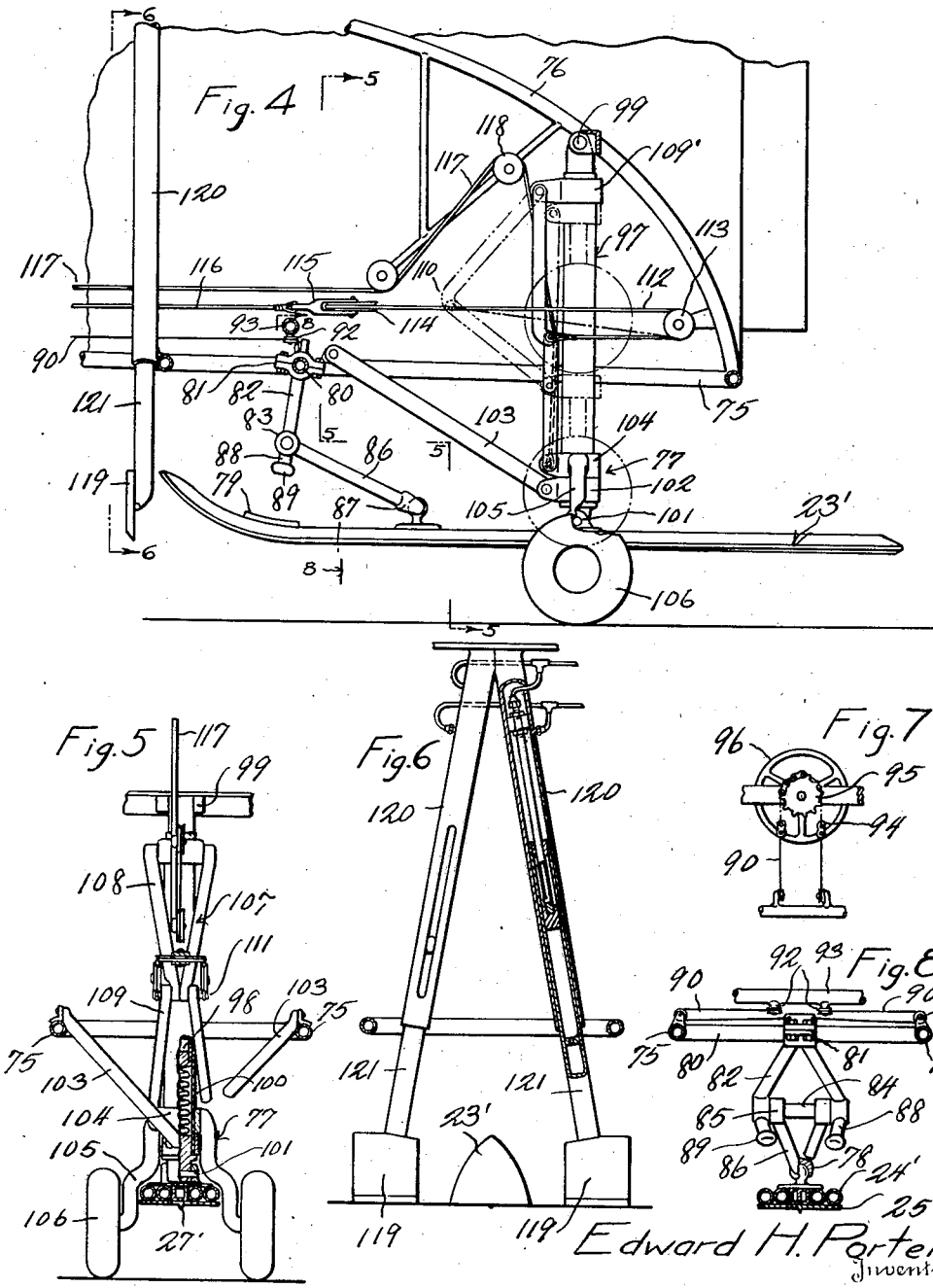

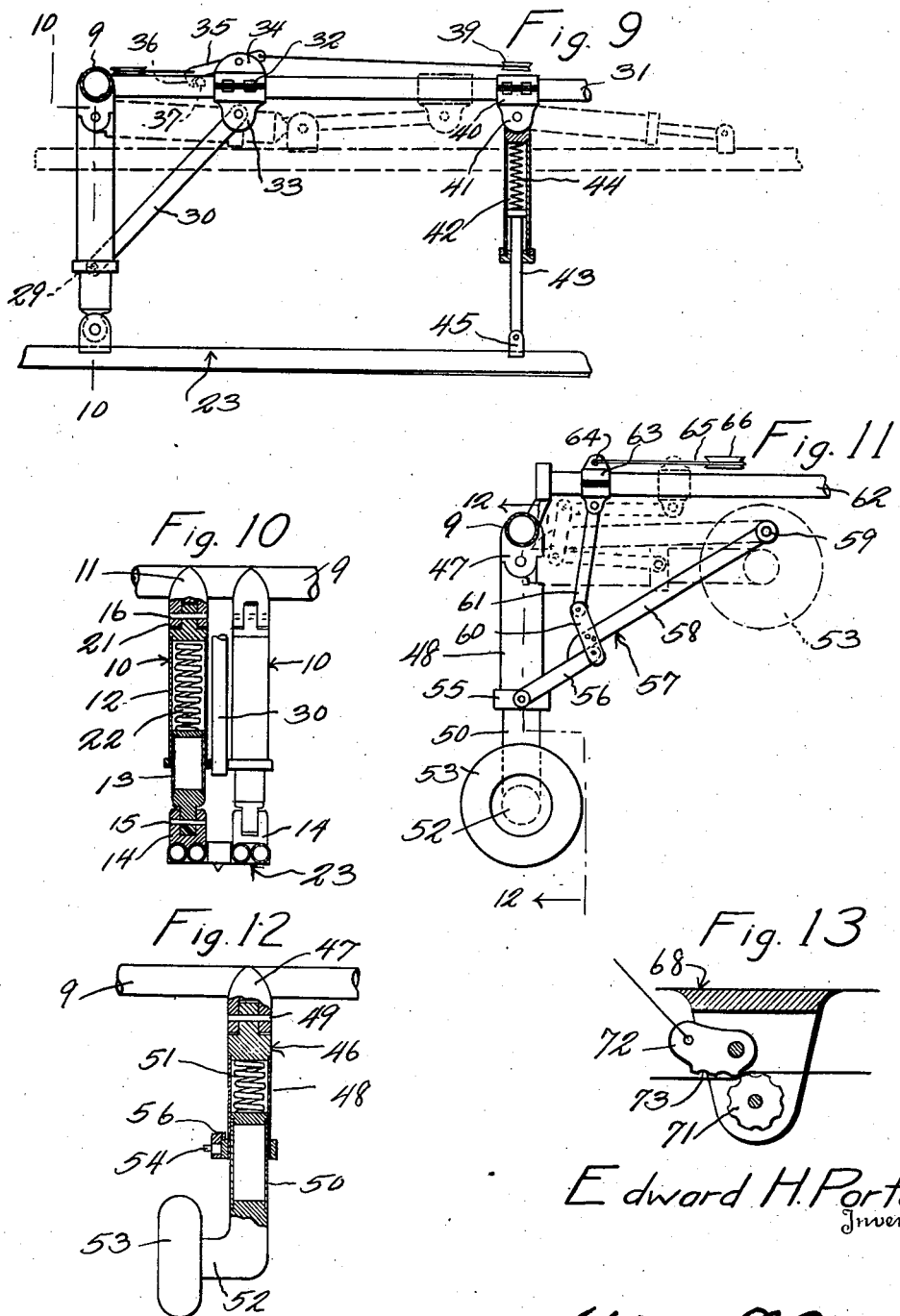

Feb. 1, 1944.   E. H. PORTER   2,340,558
AUTO SLED
Filed May 23, 1941   4 Sheets-Sheet 4
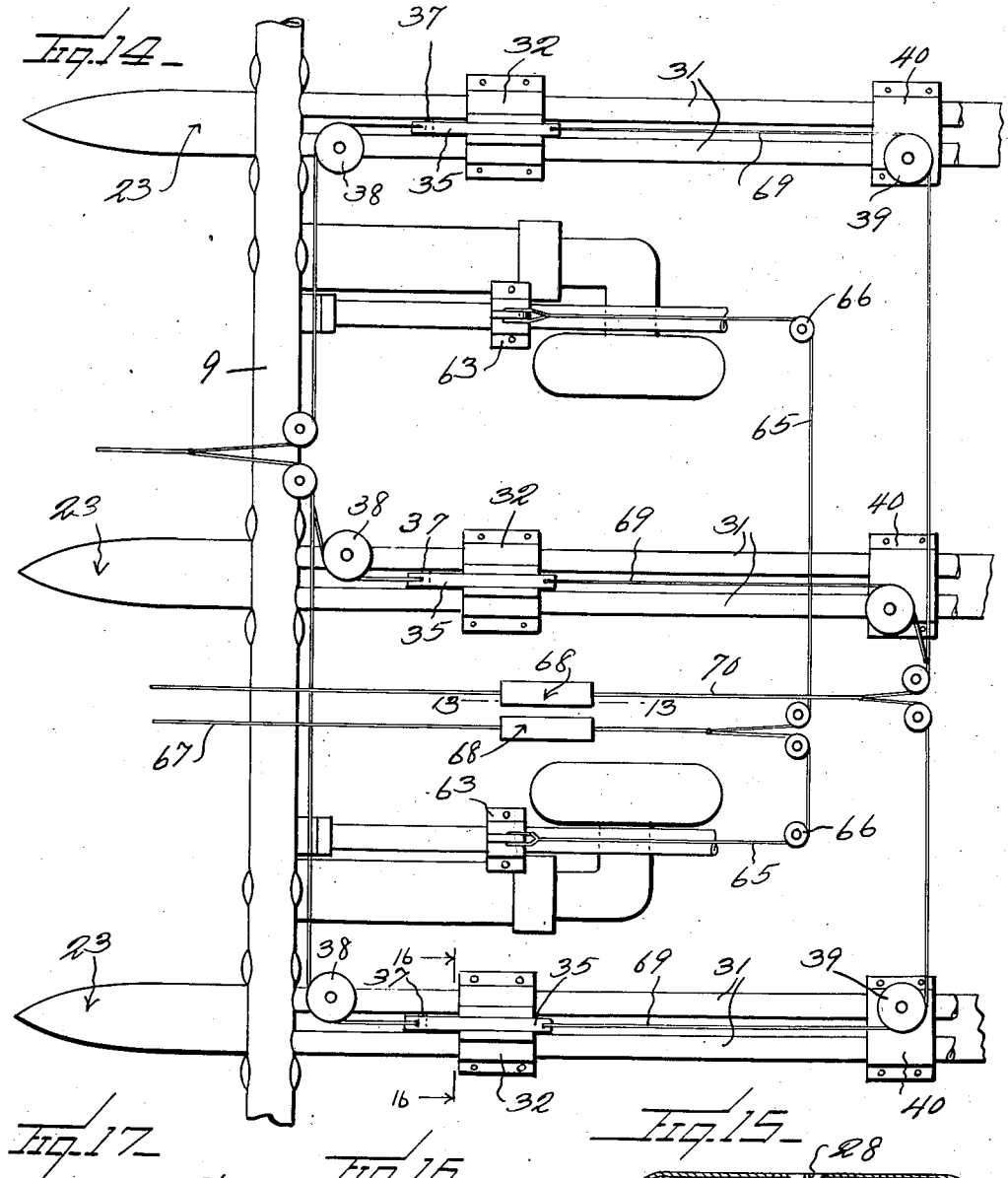
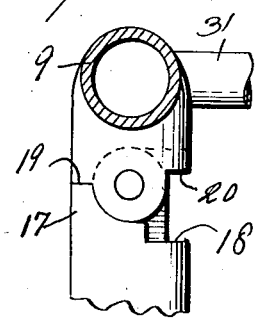
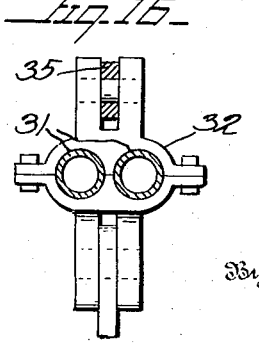
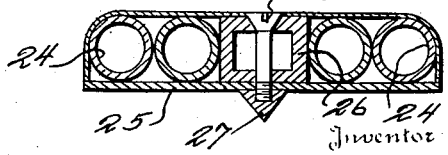
Inventor
Edward H. Porter
By Watson E. Coleman
Attorney Patented Feb. 1, 1944

2,340,558

UNITED STATES PATENT OFFICE 2,340,558

AUTOSLED

Edward H. Porter, Akron, Ohio

Application May 23, 1941, Serial No. 394,912

18 Claims. (Cl. 180—3)

This invention relates generally to the class of vehicles and pertains particularly to improvements in carriages for vehicles and more particularly to retractible carriages.

The primary object of the present invention is to provide an improved vehicle such as a sled having as a principal feature thereof, a supporting understructure or carriage consisting of both runners and wheels, in which the said runners and wheels may be selectively retracted so that either may be put into service according to the terrain over which the vehicle is obliged to move.

A further object of the invention is to provide an air propelled sled having both ski runners and wheels which may be selectively lowered or retracted for use, in which a castor runner or ski and a coacting castor wheel is provided for steering the vehicle.

Still another object of the invention is to provide a vehicle or auto air sled wherein a novel mounting is provided for the castor runner and castor wheel whereby when the castor wheel is lowered for service, it effects the lifting of the adjacent steering castor runner from the ground.

Another object is to provide an auto sled in which the construction is such as to provide stub wings which not only function as an air foil housing for the forward runners and wheels, but also tend to lift the forward end of the vehicle so that the weight of the vehicle is raised or lightened somewhat for the runners and wheels.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings—

Fig. 1 is a view in side elevation of the auto sled constructed in accordance with the present invention.

Fig. 2 is a view in top plan of the same.

Fig. 3 is a view in front elevation of the auto sled.

Fig. 4 is a view partly in section and partly in elevation of the rear runner and supporting wheel unit showing the operating parts therefor with portions of the vehicle wall structure removed.

Fig. 5 is a vertical transverse section taken substantially on the line 5—5 of Fig. 4.

Fig. 6 is a sectional view taken substantially on the line 6—6 of Fig. 4.

Fig. 7 is a fragmentary detailed view showing the steering control.

Fig. 8 is a sectional view taken substantially on the line 8—8 of Fig. 4.

Fig. 9 is a view partly in elevation and partly in section of the carriage mechanism for a front ski illustrating the manner in which the same is retracted.

Fig. 10 is a view substantially on the line 10—10 of Fig. 9, through one only of a pair of ski posts, the adjacent post being in elevation.

Fig. 11 is a view in side elevation of the carriage structure for a front wheel, showing in dotted outline the retracted position of the wheel.

Fig. 12 is a sectional view taken substantially on the line 12—12 of Fig. 11.

Fig. 13 is a detailed view of a cable lock.

Fig. 14 is a top plan view illustrating to a certain extent schematically the front supporting runners and wheels with the cable control mechanism therefor.

Fig. 15 is a transverse section on an enlarged scale of a ski showing particularly the method of applying the keel thereto.

Fig. 16 is a section taken on the line 16—16 of Fig. 14.

Fig. 17 is a view in side elevation on an enlarged scale of a ski leg and wheel leg hinge.

Referring now more particularly to the drawings, the numeral 1 generally designates the cabin or fuselage of the vehicle embodying the present invention, the rear or tail portion of which is tapered off in streamline fashion, as shown, while at the central part of the tail portion there is formed the streamlined engine housing 2 at the rear of which is constructed a guard frame 3 for a pusher type propeller 4, which is coupled directly with the engine, not shown, for direct drive therefrom.

Projecting laterally from the two sides of the fuselage 1 at the lower part thereof are the stub wings 5, each of which has formed across the top thereof, a housing 6 for a portion of the front wheel control mechanism. Outwardly from each housing 6 there is built up on the top of each wing, a smaller housing 7 which extends transversely of the wing, which accommodates a certain portion, hereinafter described, of the underlying ski control mechanism.

In the forward end of each housing 6, a light 8 is built which is directed forwardly, as shown in Figs. 1 and 2.

The fuselage 1 and the stub wings 5 are, of course, built upon suitable framework, but such framework is not here illustrated in its entirety but only such parts thereof as are necessary for the illustration and proper understanding of the manner in which the skis and wheels are supported to be moved into and out of operative position. A portion of such framework is illustrated particularly in Fig. 14 and indicated by the numeral 9, such portion constituting a tubular bar which extends transversely of the vehicle through and to the ends of the stub wings adjacent the forward or leading edges thereof. Other parts of the framework which are illustrated will be particularly identified in connection with the description of the mountings of different parts of the mechanism.

The frame bar 9 has secured thereto and extending downwardly therefrom at spaced intervals, the pairs of ski posts 10. Each of these posts includes a head 11 which is rigidly secured to the bar 9, as shown in Fig. 10, a tube 12, a plunger portion 13, which is inserted into the lower end of the tube, and a foot portion 14 which is pivotally coupled to the plunger by a pivot pin 15 for oscillation on an axis extending transversely of the vehicle. The upper end of the cylinder 12 is provided with a hinge portion 16 which at each side is shaped as is particularly illustrated in Fig. 17, to provide the stops 17 and 18 which coact with corresponding parts 19 and 20, which are carried by the heads 11 to hold the cylinder portion and lower parts of the leg in vertical or horizontal position when the leg is swung into operative or inoperative positions, respectively. The hinge portion 16 is pivotally connected with the head 11 by the pivot pin 21 which is parallel with the pivot pin 15 in the lower part of the leg so as to permit the leg to swing rearwardly and upwardly on a transverse axis.

Within each cylinder 12 is housed a shock absorber spring 22 against which the upper end of the plunger 13 bears.

Each pair of ski legs 10 is joined to a runner or ski 23, the detailed construction of which is particularly shown in Fig. 15. Each of these skis comprises a number, here shown as four, of longitudinally extending light-weight alloy steel tubes 24 disposed upon a highly polished runner 25 of the same material. Extending along the center of the top of each ski and dividing the tubular bodies 24, as shown in Fig. 15, is a series of spacers 26. The outermost ones of the front skis and the hereinafter referred to rear or steering ski, have disposed lengthwise of the bottom face, a V-shaped rubber or stabilizing strip 27 which is maintained in position by suitable securing screws 28 which are passed through the spacers 26 and into the strip, as shown in Fig. 15.

As is clearly shown in Figs. 9 and 10, the feet 14 of the ski legs 10 are secured to the tops of the skis upon opposite sides of the longitudinal center thereof. These legs 10 are coupled together by an interposed pivot pin 29 and such pin has connected therewith one end of a pull link 30 by which the lower part of the pair of legs and the adjacent ski is raised.

Extending rearwardly from the bar 9 at the top of each pair of ski legs is a pair of guide rods 31. Supported upon each pair of guide rods is a sliding cross-head 32 which is illustrated in detail in Fig. 16. A pair of depending ears 33 carried by each cross-head has pivotally connected therebetween the upper end of the pull link 30, as shown in Fig. 9. An upwardly extending pair of ears 34 carried by each cross-head has pivotally supported therebetween, a latch finger 35, the forward end of which is hooked, as at 36, for latching engagement with a keeper 37 which is mounted transversely between the guides 31. Forwardly of each keeper 37 there is mounted upon a suitable post, not shown, a cable pulley 38 while rearwardly of the cross-head there is mounted upon a suitable support, not shown, a second cable pulley which is indicated by the numeral 39. The use of these pulleys will be hereinafter more fully described.

Extending across and connecting each pair of guide bars 31 at a substantial distance rearwardly from the bar 9 is a coupling 40 which is provided with depending ears 41. To these ears is pivotally connected one end of a spring cylinder 42 into the lower end of which a plunger 43 extends, the cylinder housing a cushion spring 44 against which the upper end of the plunger 43 bears. The lower end of the plunger 43 is pivotally attached to the underlying ski, as shown in Fig. 9. This rear cylinder and plunger form a swinging rear leg, the upper end of which does not have movement lengthwise of the guides.

Upon the inner side of each outer ski, the frame bar 9 has secured thereto a wheel leg which is indicated as a whole by the numeral 46 and is particularly shown in Fis. 11 and 12. This wheel leg is constructed in somewhat the same manner as the ski legs 10 in that it has a head 47 which is fixed to the bar 9 and a cylinder 48 which is pivotally attached to the head by a pin 49 and which has extended into the lower end thereof the plunger 50. Within the cylinder 48 is housed a cushion spring 51 against which the plunger bears.

The lower end of the plunger is turned to extend laterally to provide an axle 52 upon which is mounted the ground engaging wheel 53.

The lower end of the cylinder 48 carries a pivot pin 54, which is connected with the cylinder in any suitable manner here shown as being through the medium of a collar 55 which encircles the cylinder and to which the pin is attached. To this pivot pin is connected one link section 56 of an upwardly folding or breaking brace arm which is indicated generally by the numeral 57, the second link section of this arm being indicated by the numeral 58 and being pivotally secured at its upper end at 59 to a fixed part of the frame. The links 56 and 58 of the arm 59, when they are in parallel relation have their inner ends in overlapping relation, as shown in Fig. 11, so that the arm cannot break downwardly beyond its straightened out position. The link 58 has a cross-plate 60 secured thereto inwardly of the end which is adjacent the link 56 and the inner end of the link 56 is pivotally attached to the cross-plate 60, as shown in Fig. 11, and consequently the two overlapping ends of the links are pivotally joined together. The upper end of the plate 60 has pivotally attached thereto, an end of a pull link 61, which extends upwardly from the jointed arm. At an elevation above the bar 9 and adjacent to each wheel leg 46 there is located a guide bar 62 which at its forward end is secured to the bar 9 and extends rearwardly and downwardly at a slight inclination and is connected at its other end with a suitable portion of the vehicle frame, not shown. Each of these bars carries a sliding head to the under side of which is pivotally attached the upper end of the adjacent pull link 61. The top part of the head 63 carries an ear 64 for the attachment thereto of a control cable 65. This cable extends rearwardly from the cross-head 63 and passes about a pulley 66 which is supported in a suitable manner above the guide bars 62.

The pull cables 65 which are connected with the sliding cross-heads of the front wheels are carried over suitable pulleys, as shown in Fig. 14, to a common control cable 67, which passes through an automatically closing lock unit which is indicated generally by the numeral 68.

Each of the latches 35 which is carried by a sliding cross-head 32 above each ski or runner, has connected to the rear end thereof a pull cable 69 and these cables extend rearwardly from the latches around the pulleys 39 and are then carried about suitable guide pulleys to a common control cable 70 which extends forwardly, like the cable 67, to suitable control mechanism in the forward part of the fuselage and the control cable 70 for raising the skis passes through a locking unit 68. The cables 67 and 70 are pulled forwardly by the operator of the vehicle, through the medium of any suitable type of control apparatus and when so pulled, they effect the lifting or retraction, respectively, of the wheels and the skis. When the cables are pulled forwardly to retract either the skis or the wheels, as stated, they are automatically secured against return movement by the locking unit 68, which is shown in detail in Fig. 13. This unit which is secured to a suitable portion of the vehicle structure comprises a rotatably mounted toothed wheel 71 across the top of which the control cable passes. Pivotally supported above the toothed wheel 71 is a cam 72 having a toothed lower edge 73. As shown, this cam 73 is pivoted so that when it swings down, it will bind the control cable between its toothed lower edge 73 and the wheel 71, but when swung upwardly by means of the control cord 74, with which it is connected, it will release the control cable so that it may move in a direction to release the mechanism with which it is connected.

As will be readily apparent upon reference to Fig. 11, the head portion 47 of the wheel leg is connected with the upper end of the cylinder 48 by a hinge joint of the same character as that illustrated and described in connection with the ski legs so that the wheel leg when lowered to vertical position will be stopped in such position and prevented from swinging forwardly and when raised to horizontal position for the retraction of the wheel, its upward movement will also be limited by the abutting shoulders of the hinge.

In Fig. 4, there is illustrated a portion of the rear part of the body frame which includes two horizontal longitudinally extending bars 75 and an upwardly and forwardly curving ceiling bar 76. This rear part of the body frame supports a rear rudder ski which is indicated generally by the numeral 23' and which is disposed upon the longitudinal center of the vehicle structure, as shown in Fig. 2, and a double or dual castor wheel unit, which is indicated as a whole by the numeral 77. The rear rudder ski 23' is of the same general construction as the front skis 23 in that it comprises a plurality of longitudinally extending tubes 24' supported upon a runner 25' and a central rudder rib 27' which is secured in the manner previously described in connection with the front runners and particularly illustrated in Fig. 15. This rudder ski 23' has mounted upon the top thereof the ball steering post 78 and there are also mounted upon the top of the rudder ski ahead of the steering post 78, a bumper plate 79.

Extending transversely of and supported by the frame 75 is a fixed tiller bar 80 upon which is slidably mounted the slide member 81. The slide member 81 has connnected therewith the downwardly diverging arms 82, each of which terminates at its lower end in a bearing 83. Supported in and between the bearings 83 is a pivot shaft 84 which passes through a pair of bearings 85, each of which has extending downwardly therefrom, an arm 86. The arms 86 are in convergent relation toward their lower ends and are joined together by the socket 87 which operatively receives the ball head of the steering post 78. The slide member 81 is considerably in advance of the ball and socket connection between the arms 86 and the steering rudder, as is shown in Fig. 4. Therefore, the arms 86 extend rearwardly as well as downwardly for turning the forward end of the rudder ski upon a vertical axis which is rearward of the ball and socket connection as hereinafter described.

Each of the bearings 83 has extending downwardly and inwardly therefrom a stub arm 88 which is protected at its lower end by a bumper 89 which is adapted to contact the bumper plate 79 in the event that the forward end of the rudder ski is violently forced upwardly in its movement over the ground.

Transverse movement of the steering slide member 81 which moves upon the tiller bar 80, is effected through the medium of the cables 90, each of which is connected with one side of the slide member 81 and extends laterally to and around a pulley 91 which is supported upon a side of the frame 75 and then passes back to a guide pulley 92 supported upon a suitable supporting bar 93 near the longitudinal center of the vehicle, from where it passes forwardly to the control cabin of the vehicle for connection with an end of a steering chain 94 which, as shown in Fig. 7, passes around a suitable control gear 95 which is coupled with a steering wheel 96.

Rearwardly of the tiller bar 80 upon the longitudinal center of the vehicle body there is located the vertical post which is indicated as a whole by the numeral 97 and which constitutes a vertical axis about which the dual steering wheels 77 turn and on which they move vertically when being retracted from or put into operative position. This post comprises a plunger portion 98 which is secured at its upper end, as indicated at 99, to the frame part 76 for oscillatory movement forwardly and rearwardly of the machine upon a transverse pivotal axis and a cylinder 100 into which the plunger extends. The lower end of the cylinder 100 is pivotally connected as indicated at 101, in Figs. 4 and 5, to the steering or rudder ski 23' at a substantial distance rearwardly of the steering post 78. The pivot 101 extends transversely of the ski so that it may have rocking movement upon a transverse axis. It will also be apparent that since the cylinder 100 is free to rotate around the plunger 98, the post also forms a vertical axis of rotation for the steering ski when the steering mechanism is operated.

A collar 102 encircles the lower end of the cylinder 100 and has connected therewith the forwardly diverging bracing arms 103 which are secured to the sides of the frame 75, as is most clearly shown in Fig. 5. The cylinder is free to rotate in this collar 102 and the collar therefore merely provides a brace and positioning means for the lower end of the post to maintain it vertical and upon the longitudinal center of the machine.

The castor wheel unit 77 comprises a collar 104 which encircles the lower end of the post cylinder 100 and is adapted to move up and down upon the cylinder and integral with this collar are the two laterally and downwardly extending wheel arms 105, each of which at its lower end rotatably supports a ground engaging wheel 106. As shown in Fig. 5, these arms are spaced to straddle the steering ski and to move the wheels 106 downwardly a substantial distance beyond the ski so that by lifting the rear end of the machine from the ground, the ski will be raised from contact with the ground to be held in the position in which it is shown in Figs. 4 and 5.

It will be seen upon reference to Fig. 5 that the arms 105 closely engage opposite edges of the steering ski when the wheels are down and, consequently, turning movement imparted to the ski on the axis of the steering post 97 will impart corresponding turning of the wheel unit and the cylinder on and around plunger 98 as a common axis for the steering of the vehicle by means of the wheels.

The mechanism by which the castor wheel unit is raised and lowered comprises a toggle 107 comprising an upper arm 108 which is pivotally attached to a collar 109' which is secured around the upper end of the cylinder 100, and a lower arm 109 which is pivotally secured at its lower end to the collar 104 to which the wheel arms are attached. The upper arm of the toggle at its lower end is angled or turned toward the cylinder, as indicated at 110, and this turned end is pivotally connected with the upper end of the arm 109, so there is thus formed an elbow joint between the arms. At this joint, which is indicated by the numeral 111, there is connected with each side of the elbow, an end of a control cable 112, which passes rearwardly over a suitably supported pulley 113 and then passes forwardly and around a pulley 114 which is supported in a block 115. The block 115 is connected with a control cable 116 which extends forwardly to the control cabin of the vehicle. By means of this pulley 116, the toggle arm may be straightened out so as to maintain the dual wheel unit in lowered position as it is shown in full lines in Fig. 4.

In order to raise the wheel unit and effect the folding of the toggle, there is connected with the collar 104, a control cable 117 which extends upwardly between the toggle and the post 97 to an elevated pulley 118 and from this pulley it passes forwardly to the control cabin of the vehicle. When the wheel unit is down, a pull exerted upon the cable 117 will tend to break the toggle joint and cause it to bend forwardly, as shown in broken lines in Fig. 4, until the pivoted lower end of the arm portion 109 moves upwardly on the post cylinder beyond the elevation of the joint or elbow of the toggle, whereupon the two arms will begin to fold into parallel side by side relation and the joint will again swing in toward the post, thus maintaining the pair of wheels in the uppermost position in which they are illustrated by broken lines in Fig. 4. When the wheels are in this raised position they can be securely held by tightening the pull cable 116 which will cause the joint to be drawn in closely against the post. When the wheels are to be lowered, both cables 116 and 117 are slackened and the weight of the wheels thrusting downwardly against the joint between the arms, the pivot center of which is at the inner end of the curved portion of the upper arm 108, will cause the joint to break forwardly and after the collar 104 has moved below the elevation of the joint for the toggle, the wheels may be forced downwardly by applying a pull to the cable 116. By this action the rear end of the vehicle will be raised when the castor wheel unit engages the ground and, consequently, the steering ski or runner 23' will be lifted free of the ground as illustrated.

Disposed forwardly of the steering runner or ski 23' are ground engaging brakes 119 of the drag type commonly employed in airplanes. These brakes are actuated in the usual manner by fluid pressure operating in the cylinders 120 to extend and retract the pistons 121 to the lower ends of which the brake blades are connected. No detailed description of these brakes is believed to be necessary since they are of well-known type.

As previously stated, no control means have been shown in connection with the operation of the several control cables by which the extension and retraction of the skis and the wheels is effected since such control means may be in the nature of ordinary hand levers or any other suitable mechanism for effecting a desired pull upon the cables and it is not believed that a specific showing and description of such means is required.

It will be readily apparent from the foregoing that the structure herein described is particularly well adapted for traveling over any type of terrain whether the same be covered with snow or clear, since by the extension of one type of support and the retraction of the other, the vehicle can be made to travel over snowy ground or over intermediate clear stretches, as may be required.

It will also be readily appreciated that although the illustration and description of the invention has been confined to a land vehicle, the retractible undercarriage may be readily applied to airplanes so as to adapt such machines to landings on snowy ground as well as upon stretches which are free of snow. It will, therefore, be understood that in making reference in the appended claims to a vehicle body or vehicle structure, this is intended to cover aircraft as well as craft which is restricted to ground.

What is claimed is:

1. A vehicle, comprising a body, a supporting under carriage structure disposed beneath the forward part of the body and including for use as a unit, a plurality of runner elements and, for use as a separate unit, a plurality of wheel elements, supporting posts for said runner elements forming part of said structure and pivoted for swinging between vertical and horizontal positions, supporting legs for the wheel elements forming part of said structure and pivoted for swinging between vertical and horizontal positions, means for swinging said posts and legs for effecting selective extension and retraction of the runners and wheels for contact with the ground whereby one unit may be in use when the other unit is retracted, and a ground engaging supporting means carried by the body in the rear portion thereof for supporting said rear portion and for steering the body.

2. A vehicle of the character described, comprising an elongated body structure, means supported by the body for effecting forward movement of the same, a plurality of ground engaging runners connected with the vehicle beneath the forward portion of the body, post members pivotally coupled at their ends to the body and runners and swingable between vertical and horizontal positions for raising of said runners to a retracted position beneath the body and for lowering the runners, wheel means for supporting the forward part of the vehicle in substitution for said runners, legs pivotally coupled with the body and wheels and facilitating the retraction of the wheels from the ground and the lowering of the wheels into engagement with the ground, and ground engaging supporting means connected with the vehicle at the rear thereof for effecting the steering of the vehicle.

3. A vehicle of the character described, comprising an elongated body structure, means supported by the body for effecting forward movement of the same, a plurality of ground engaging runners connected with the vehicle beneath the forward portion of the body, means facilitating the raising of said runners to a retracted position beneath the body and for lowering the runners, wheel means for supporting the forward part of the vehicle in substitution for said runners, means connecting said wheel means with the vehicle facilitating the retraction of the wheels from the ground and the lowering of the wheels into engagement with the ground, ground engaging supporting means connected with the vehicle at the rear thereof for effecting the steering of the vehicle, said steering means comprising a runner member and a wheel member, and means supporting said members whereby the same may be selectively brought into contact with the ground.

4. A vehicle, comprising a body structure, a support extending transversely of the body, a plurality of runners hingedly connected with said support to be shifted relative thereto into ground engaging operative position or into retracted inoperative position, means for effecting the shifting of said runners into either of said positions, leg members pivotally connected with said support to be oscillated from a vertical position to a horizontal position, wheels carried by the leg members, means for shifting the leg members into and out of said positions, said runners being adapted to be shifted as a unit into and out of operative positions and said wheel legs being adapted to be shifted as a unit into vertical or horizontal positions, and means connected with the body at the rear thereof for steering the vehicle.

5. A vehicle, comprising a body structure, runners pivotally supported from the body to be moved to a ground engaging operative position or to a retracted inoperative position, means for shifting the runners into and out of said positions, wheels connected with said body to be oscillated into a ground engaging operative position and into a retracted inoperative position, mechanism for shifting said wheels into and out of said positions, a single steering runner supported upon the longitudinal center of and below the body at the rear of the vehicle, means for turning said runner on a vertical pivot for steering, a steering wheel unit supported to be turned on said vertical pivot, means for relatively shifting the wheel unit and the single runner vertically for selective engagement of either with the ground, and means for effecting the turning of the wheel unit on the vertical pivot when the wheel unit is in contact with the ground.

6. A vehicle, comprising a body structure, selectively extensible and retractible wheel and runner units for supporting the forward part of the vehicle, mechanism for selectively extending and retracting said units, and combined supporting and steering mechanism disposed rearwardly of said units and comprising a runner disposed upon the longitudinal center of the vehicle, and a steering wheel unit, means for turning the runner and the wheel unit upon a common vertical axis, mechanism for effecting the turning of the runner and unit, and mechanism operatively coupled with the wheel unit for extending the same into and retracting the same from contact with the ground, the wheel unit when brought into contact with the ground effecting the removal of the runner from contact with the ground.

7. A vehicle, comprising a body structure, selectively extensible and retractible wheel and runner units for supporting the forward part of the vehicle, mechanism for selectively extending and retracting said units, a combined steering and supporting mechanism for the rear of said body, comprising a ground engaging runner, a vertical pivot coupling the runner with the body, means for turning the runner about said vertical pivot, a wheel unit supported for turning about said vertical pivot and for vertical movement along the axis of the pivot, means for raising and lowering the wheel unit, said wheel unit when in lowered position for engagement with the ground effecting the raising of the runner from contact with the ground, and means for establishing an operative coupling between the runner and the wheel unit when the wheel unit is in contact with the ground by which turning movement of the runner about the vertical axis will be imparted to the wheel unit for steering the latter.

8. A vehicle including a body, means for effecting the movement of the body over the ground, a supporting under carriage for the forward part of the vehicle including selectively extensible and retractible ground engaging wheels and runners, and steering mechanism for the vehicle disposed in the rear portion thereof, said steering mechanism additionally functioning to support the rear of the vehicle and including a runner and a wheel, said steering mechanism, runner and wheel being turnable as a unit about a common vertical axis and being supported for selective engagement with the ground.

9. A vehicle, comprising a body, power means for effecting movement of the body over the ground, a supporting under carriage for the forward part of the vehicle, comprising ground engaging runners and ground engaging wheels, means coupling the runners and the wheels for selective movement into contact with the ground and retraction from the ground whereby the runners as one unit and the wheels as another unit may be employed interchangeably for supporting the vehicle, and a supporting steering mechanism disposed at the rear of the body, said mechanism comprising a single longitudinally extending runner disposed on the longitudinal center of the vehicle, means coupling the runner with the body for turning on a vertical axis, a steering control carried by the body for movement transversely thereof and coupled with the runner forwardly of said pivot for turning the runner on the pivot, a wheel unit supported from the body for vertical movement, said wheel unit being turnable about said pivot, means for extending the wheel unit downwardly into contact with the ground and for simultaneously effecting the raising of the runner from contact with the ground, and means for effecting the rotation of the wheel unit about said vertical pivot by means of said steering mechanism.

10. A vehicle, comprising a body, power means for effecting movement of the body over the ground, a supporting under carriage for the forward part of the vehicle, comprising ground engaging runners and ground engaging wheels, means coupling the runners and the wheels for selective movement into contact with the ground and retraction from the ground whereby the runners as one unit and the wheels as another unit may be employed interchangeably for supporting the vehicle, and a supporting steering mechanism disposed at the rear of the body, said mechanism comprising a single longitudinally extending runner disposed on the longitudinal center of the vehicle, means coupling the runner with the body for turning on a vertical axis, a steering control carried by the body for movement transversely thereof and coupled with the runner forwardly of said pivot for turning the runner on the pivot, a wheel unit supported from the body for vertical movement, said wheel unit being turnable about said pivot, a toggle mechanism comprising two pivotally coupled arms, one of said arms being pivotally attached to the wheel unit and the other one of said arms being pivotally secured at a substantial distance above the wheel unit, means for effecting the breaking of the toggle in a manner to effect the vertical movement of the attached end of the first-mentioned arm to effect the raising and lowering of the wheel unit, said wheel unit including a pair of downwardly diverging arms and a wheel pivotally supported upon each of the diverging arms, said arms being spaced to straddle said runner of the steering mechanism and to establish an operative coupling therewith whereby turning of the runner upon said pivot will impart turning movement about the same pivot to the wheel unit.

11. A vehicle of the character described, comprising an elongated body, means supported by the body for effecting longitudinal movement of the same, a plurality of ground engaging runners connected with the vehicle beneath the forward portion of the body, post members pivotally coupled at their ends to the body and runners and swingable between vertical and horizontal positions for raising said runners to a retracted position beneath the body and for lowering the runners, wheel means for supporting the forward part of the vehicle in substitution for said runners, legs pivotally coupled with the body and wheels and facilitating the retraction of the wheels from the ground and the lowering of the wheels into engagement with the ground, ground engaging supporting means connected with the vehicle at the rear thereof for effecting the steering of the vehicle, said steering means comprising a runner member and a wheel member, and means supporting said members whereby the same may be selectively brought into contact with the ground.

12. A vehicle, comprising a body structure, a supporting unit secured to and extending transversely of the body, post members each pivotally attached at one end to said supporting unit, the pivotal attachment of the posts being in the form of a hinge having cooperating stop shoulders for limiting the swinging movements of the post from a vertical position beneath the body to a horizontal position, runner members each pivotally attached to a post, means for effecting the swinging of said posts to move the runners between ground engaging position and raised position beneath the body, means for maintaining the runners always in horizontal position during the swinging of the posts, leg members pivotally coupled to the supporting unit to swing between vertical and horizontal positions, the pivotal support for the legs being in the form of hinges having coacting stop shoulders for limiting the swinging of the legs between vertical and horizontal positions, means for effecting the swinging of said legs, wheels carried by the legs, and a steering element operatively coupled with the body and comprising a runner and a wheel, the runner and wheel of the steering element being adapted for selective engagement with the ground.

13. A vehicle as set forth in claim 12 in which said runners and wheels have yieldable movement toward and away from the body independently of their connection to the body by the posts and legs, when in contact with the ground.

14. A vehicle as set forth in claim 12 in which said posts and legs comprise two telescopically joined sections, and resilient means normally resisting the relative movements of the sections in one direction.

15. A vehicle comprising a body, a beam secured to and extending transversely of the body, guide beams extending lengthwise of the body from the transverse beam, a series of posts and legs each hingedly attached to the transverse beam for oscillation on a common transverse axis between vertical and horizontal positions, slides supported upon the guide beams, coupling links between the slides and the adjacent posts and legs, means for effecting the movement of said slides on the guide beams for selectively swinging the posts and legs between vertical and horizontal positions, wheels carried by said legs, runners pivotally attached to the posts, and a pivoted coupling unit between each runner and an adjacent guide beam which is spaced from and maintains parallel relation with the adjacent post and functions to maintain the runner at all times horizontal from ground engaging to raised positions.

16. A vehicle as set forth in claim 15 in which the pivoted coupling comprises a post formed in two telescopically connected parts, spring means normally urging separatory movement of said parts, the said posts and legs also being in two telescopically connected parts, and spring means within the posts and legs normally urging separatory movement of the parts thereof.

17. In a vehicle of the character described having supporting wheels and runners designed for selective contact with the ground, a steering unit comprising a runner, means for maintaining the runner in fixed vertically spaced relation with the underside of the vehicle, said means forming a vertical pivot for the runner, means for turning the runner on said pivot, a wheel supported adjacent the runner for both vertical movement and for turning movement about a vertical axis, means for moving the wheel vertically to positions above and below the runner, and means by which the wheel is operatively coupled with the runner when it is in position below the runner whereby turning steering movement imparted to the runner will be transmitted to the wheel.

18. In a vehicle having a body and supporting wheels and runner adapted to be selectively contacted with the ground, a steering unit comprising a runner, means pivotally coupling the runner with the vehicle body for turning around a vertical axis, means for turning the runner about the axis, a wheel, means for supporting the wheel adjacent the runner for vertical movement from a position in which it is below the runner to a position in which it is above the runner, the wheel being turnable about said axis, and means for establishing a locking connection between the wheel and runner of the steering unit when the wheel is moved to a position below the runner whereby the runner and wheel will turn as a unit on said axis when steering movement is imparted to the runner.

EDWARD H. PORTER.